United States Patent
Halberstadt et al.

(10) Patent No.: US 9,831,787 B1
(45) Date of Patent: Nov. 28, 2017

(54) RESONANT POWER CONVERTER WITH SWITCHABLE REFLECTED OUTPUT VOLTAGE

(71) Applicant: NXP B.V., Eindhoven (NL)

(72) Inventors: Hans Halberstadt, Groesbeek (NL); Ferdinand Jacob Sluijs, Nijmegen (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/167,364

(22) Filed: May 27, 2016

(51) Int. Cl.
*H02M 3/335* (2006.01)
*H02M 7/48* (2007.01)

(52) U.S. Cl.
CPC ... *H02M 3/33569* (2013.01); *H02M 3/33546* (2013.01); *H02M 3/3353* (2013.01); *H02M 2007/4811* (2013.01); *H02M 2007/4815* (2013.01); *H02M 2007/4818* (2013.01)

(58) Field of Classification Search
CPC .......... H02M 3/33569; H02M 3/3376; H02M 7/53871; H02M 7/537; H02M 7/5387; Y02B 70/1433
USPC ........ 363/16, 17, 21.02, 21.03, 98, 131, 132
See application file for complete search history.

(56) References Cited

U.S. PATENT DOCUMENTS

| | | | |
|---|---|---|---|
| 6,697,267 B2 | 2/2004 | Tolle et al. | |
| 2007/0236967 A1* | 10/2007 | Liu | H02M 1/4241 363/21.02 |
| 2009/0316443 A1 | 12/2009 | Coccia et al. | |
| 2010/0165668 A1* | 7/2010 | Lin | H02M 1/10 363/21.02 |
| 2011/0164437 A1 | 7/2011 | Sun et al. | |
| 2012/0075888 A1* | 3/2012 | Eom | H02M 3/3376 363/21.02 |
| 2014/0036545 A1 | 2/2014 | Reddy | |
| 2016/0190945 A1 | 6/2016 | Liu et al. | |

FOREIGN PATENT DOCUMENTS

| | | |
|---|---|---|
| CN | 104539165 A | 4/2015 |
| WO | WO-2012/155325 | 11/2012 |

OTHER PUBLICATIONS

Sun, Xiaofeng et al; "An Improved Wide Input Voltage Buck-Boost + LLC Cascaded Converter"; 2015 IEEE Energy Conversion Congress and Exposition; pp. 1473-1478 (2015).
Yang, Bo; "Topology Investigation of Front End DC/DC Converter for Distributed Power System—Chapter 2"; retrieved from the internet https://theses.lib.vt.edu/theses/available/etd-09152003-180228/ Mar. 18, 2016; 57.

* cited by examiner

Primary Examiner — Nguyen Tran

(57) ABSTRACT

Disclosed is a power converter including a generator configured to generate a sequence of output voltage waveforms, a resonant tank connected to the generator comprising at least one capacitor and at least one inductor, a transformer including a primary side connected in series with said series inductor and, the primary side being configurable to use at least one primary winding tap and a secondary side for connecting to a rectifying circuit for providing a rectified DC voltage to an output load circuit, a first switch and a second switch on the primary side connected to the primary winding, wherein the at least one primary winding is selected by the first switch or the second switch to select a different reflected output voltage by closing the first switch or the second switch.

20 Claims, 15 Drawing Sheets

RESONANT POWER CONVERTER WITH SWITCHABLE REFLECTED OUTPUT VOLTAGE

TECHNICAL FIELD

Various exemplary embodiments disclosed herein relate to a power converter and more particularly to a resonant converter utilizing an LLC resonant circuit.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of embodiments adequate to allow those of ordinary skill in the art to make and use the inventive concepts will follow in later sections.

Various exemplary embodiments relate to a power converter including a generator configured to generate a sequence of output voltages having a waveform, a resonant tank connected to the generator including at least one capacitor and at least one inductor, a transformer having a primary side connected in series with said series inductor and, the primary side being configurable to use at least one primary winding tap and a secondary side for connecting to a rectifying circuit for providing a rectified DC voltage to an output load circuit, and a first switch and a second switch on the primary side connected to the primary winding, wherein the at least one primary winding is selected by the first switch or the second switch in order to select a different reflected output voltage by closing the first switch or the second switch.

The power converter may be an LLC converter. The power converter may be an asymmetrical half-bridge converter.

Clamping diodes may limit the voltage across the first switch or the second switch. A turns ratio for each primary winding tap may be optimized for efficiency.

Output power may be controlled by adapting a duty cycle of the generator between a half-cycle and a total period. Output power may be controlled by adapting a duty cycle of the generator from zero to a half-cycle. The power converter may be controlled by state variables.

The rectifying circuit may include a rectifier diode. Energy may be delivered to the load via the rectifier during a time period. An operating frequency of the controller may be chosen such that the end of the time period is close to a point where the rectifier stops conducting. The time period may be slightly shorter than half a period of a resonance frequency of the power converter as set by the at least one inductor and at least one capacitor. The time period may be optimized to get operation close to resonance frequency during a half-cycle.

The generator may generate a square wave. The resonant tank may include at least one capacitor in series with the at least one inductor. The selection of the first switch or the second switch may be based on a desired output voltage.

The power converter may receive voltage from a mains and the selection of the first switch or the second switch may be based on a level of the mains voltage.

Various exemplary embodiments also relate to a method of operating a power converter having a generator, at least one capacitor and at least one inductor, a transformer having a primary side and a secondary side, the primary side connected in series with the inductor, and a plurality of switches on the primary side and connected to a primary winding, the method including operating the plurality of switches on a primary side of the transformer to form a resonant tank circuit having a plurality of taps, and selecting at least one of the plurality of taps to vary an output voltage of the power converter.

The method may include selecting one of the plurality of taps based on a desired output voltage. The method may include receiving voltage from a mains and selecting of one of the plurality of taps based on a level of the mains voltage

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

DETAILED DESCRIPTION

Embodiments described herein relate to switch mode power supplies (SMPS) and also to SMPS for medium and low power applications, for example, below about 75 watts nominal power and with universal mains input. Such power supplies are often used as charging equipment (adapters) for smart phones and small laptops. According to developments such as USB power delivery (USBPD) a power supply may be able to generate a series of output voltages.

A generally applied topology for such adapters is flyback topology due to simplicity and good performance. With such topology, efficiencies up to approximately 90% are possible.

There is also a trend in the market to use smaller size adapters which may have a high power density. A certain power produced with a given efficiency may produce heat which produces a temperature rise in an adapter. A smaller volume without additional measures would produce a higher temperature in the adapter when operating at a maximum continuous power level, which is unacceptable. A solution could be a fan, but this is generally not acceptable for such adapters. Another solution could be to increase an efficiency of the power conversion process, such that less heat has to be dissipated.

A combination of two inductors and one capacitor ("L-L-C") may form a resonant converter that is EMI friendly, combined with the capability of producing zero-voltage switching (soft switching) through careful design.

Resonant topology such as an LLC resonant converter has the opportunity to provide very high efficiency, because of soft switching and low RMS currents, while only a small part of the delivered power is stored in the resonant components. These good characteristics, however, may only be used in practice if the converter operates close to its optimum operating point, which is the load independent point. Resonant converters are switching converters that include a tank circuit including a series configuration of capacitor, inductor, and inductance of the primary winding (LLC) actively participating in determining input-to-output power flow.

Figure 1:
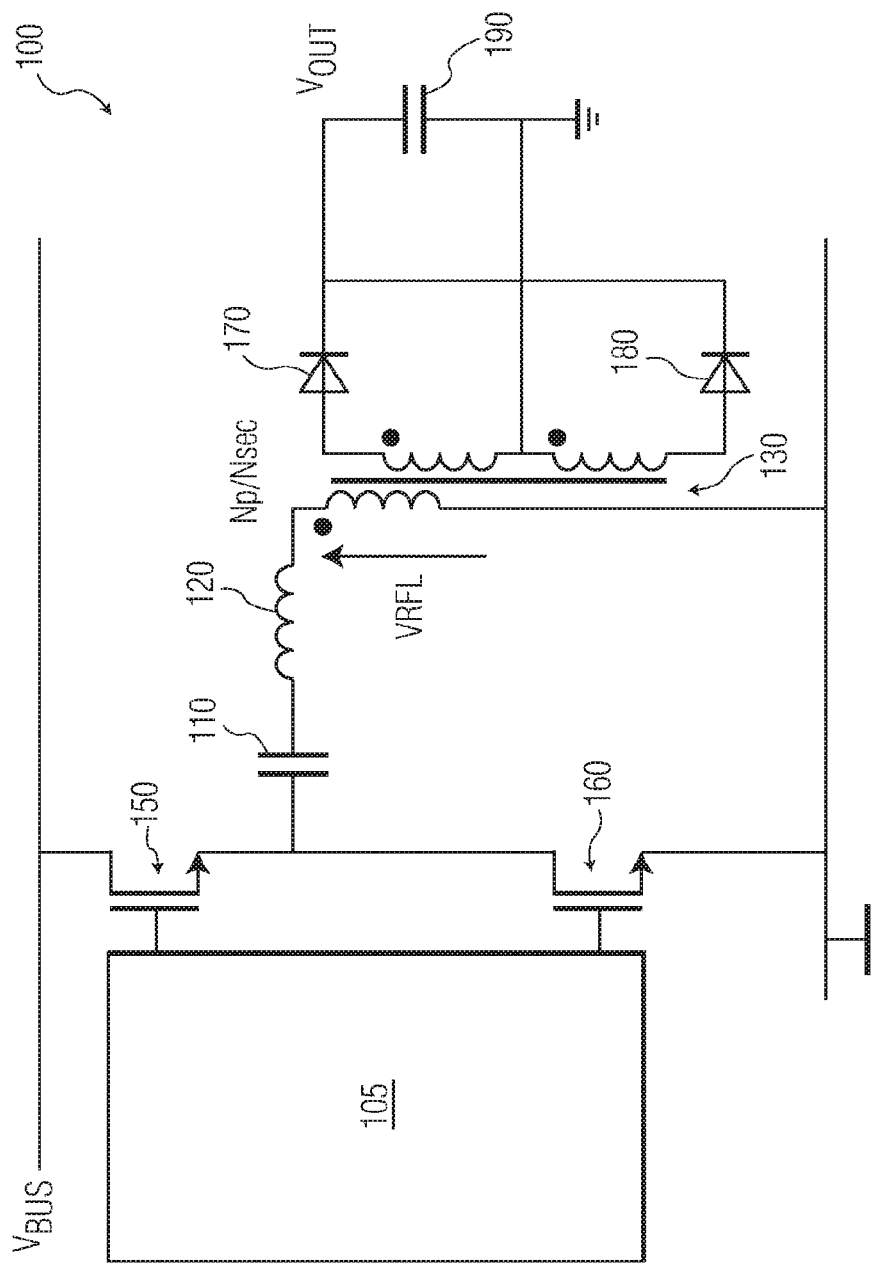
FIG. 1 illustrates an LLC resonant converter in accordance with embodiments described herein.

FIG. 1 illustrates an LLC resonant converter 100. A resonant capacitor 110 may resonate with a resonant inductor 120. A transformer 130 having a predetermined number of windings (Np) on a primary side and a predetermined number of windings (Nsec) on a secondary side may be used to adapt an input voltage $V_{BUS}$ to an output voltage $V_{OUT}$ such that an optimum operating point can be reached. The resonant inductor 120 may often be a leakage inductance of the transformer 130 instead of a separate inductor 120. The optimum operation point may occur when the reflected output voltage $V_{RFL}$ being Np/Nsec×$V_{OUT}$ equals $V_{BUS}$/2. The transformer may further include a magnetizing inductance that has a role in the total resonance, for example to provide for soft switching of the primary switches 150 and 160 and to be able to operate below resonance when $V_{BUS}/V_{OUT}$ is below the optimum for operation in a load independent point. A capacitor 190 acts as smoothing capacitor to filter out the AC component of the current being delivered to the load to be connected at a secondary side of the transformer 130.

At a load independent point, a ratio between input voltage and output voltage is such that sinusoidal currents occur, while the converter operates close to the resonance frequency. Operation further away from this point is possible, but at a penalty of a lower efficiency. When the ratio of input voltage/output voltage is larger than the optimum, the converter operates above resonance in so called continuous conduction mode (CCM) operation. In CCM operation, compared to operation at the load independent point, the turns ratio is lower than the optimum, giving more RMS current at the primary side and therefore more conduction losses in the switches and primary part of the transformer. In extreme cases, for example input voltage/output voltage larger than a factor 1.3 above the optimum, the switching frequency of switches 150 or 160 may also become very large, resulting in issues with frequency dependent resistances as a result of skin and proximity effect, resulting in even more RMS losses. Also soft switching can be lost as current levels in the magnetizing inductances are being reduced due to a higher frequency. The effect of frequency increase may be reduced by allowing more resonance. This may be possible by choosing a lower value of the resonant capacitor and a higher value of the resonant inductor, such that the product remains the same (same resonance frequency), but the ratio of the resonant capacitor to resonant inductor 110/120 becomes lower. The effect is a larger amplitude of the resonating voltage across the resonant capacitor 110 and as a result less frequency increase. One disadvantage is that the transformer 130 may become bigger as result of an increased inductance value.

Operation at a lower ratio between input and output voltage is also possible and gives operation below resonance. The result is a lower switching frequency and discontinuous operation of the secondary diodes 170 and 180. Due to the discontinuous operation, the interval during the cycle where no current flows at the secondary side becomes larger, giving higher RMS value of a same average output current and therefore more RMS losses.

Traditionally, resonant converters may be used for high power applications above about 75 watts nominal power level. For such levels, a power factor correction circuit (PFC) may be required. The PFC is often a boost converter with a fixed on time of a high frequency (HF) switching cycle, therefore automatically giving a resistive input characteristic which may be the reason for a high power factor.

The PFC may convert a rectified AC mains voltage into an intermediate voltage of around 385 VDC. A fixed output voltage of the power supply may correlate well with a high efficiency of a resonant LLC converter at fixed optimum ratio of input and output voltage.

For powers below 75 watts, a PFC is not required, while still requiring universal mains operation between 90 VAC and 264 VAC. As this voltage range is almost a factor 3, the LLC resonant converter 100 efficiency would seriously degrade over such a large range of input voltages.

The LLC resonant converter 100 may use asymmetrical control in which an asymmetrical square wave is introduced to the transformer. This gives asymmetrical currents in the output diodes 170 and 180, and this type of control can also prevent very high switching frequencies, because one half cycle can be controlled at a frequency close to resonance, meaning that that the current in the resonant capacitor or inductor almost follows a complete halfcycle of its natural frequency $$f_0 = \frac{1}{2\pi\sqrt{L_r C_r}}.$$

Further away from resonance means that only a small part of the full sinusoidal period is followed by using asymmetrical operation. One halfcycle operation close to resonance is possible at the same input and output voltage ratio such as half of sinewave current between 4.5 and 5.5 μs.

In this way, the resonant converter 100 can be kept under control even at very low output voltages without having excessive frequency increase or using large leakage inductor values to limit the frequency increase.

A major issue with flyback topology is the requirement for temporary over power, for example 200% of its nominal power during a few hundred milliseconds. Because of its temporary character, the overpower situation is not limiting for the power density, but it can cause saturation of a flyback transformer, requiring a larger transformer for overpower situations. This is not in line with the requirement for higher power density. A solution is to use continuous mode operation, but this results in timing issues with synchronous rectification (SR) as SR is also required for flyback to increase the efficiency to an acceptable level. Resonant topology can easily deal with a 200% overpower situation, because only a small fraction of the power is stored in the transformer, so the overpower situation does not increase the transformer size for a resonant converter and is therefore easier to reach the high power density when the overpower situation is also required. Because resonant topology has a relatively large leakage inductance, the instantaneous rates of current change (di/dt's) are not that large compared to CCM flyback. Therefore SR results in fewer issues than the resonant topology.

It is therefore an advantage to make resonant topology suited for universal mains operation, while limiting the penalty of reduced efficiency. It would be a further advantage to make resonant topology suited for variable output voltage, as this could prevent an additional Buck stage to take care of the output voltage range because any additional stage adds cost and volume and is an additional part of the chain with efficiency loss.

Embodiments described herein provide a solution regarding efficiency degradation due to a large input voltage range. Embodiments include use of an asymmetrical operation in order to prevent severe increase of the switching frequency at low $V_{OUT}$, while still having sufficient efficiency at low output voltages as required for USBPD. Embodiments provide a good solution for overpower situations.

Embodiments described herein include a resonant converter with an adaptable turns ratio to support different combinations of input and output voltage.

An embodiment includes using different taps at the primary side of the transformer, where a tap is connected to the resonant capacitor and the switch is used to close the conduction path of a resonant tank circuit. A condition of resonance will be experienced in a resonant tank circuit when reactances of the capacitor and inductor are equal to each other. A highest efficiency may be reached by bringing the converter operating point towards the resonance frequency by using an optimum turns ratio for each tap.

The resonance frequency for each connected tap can be optimized by using an optimum relationship between the value of the resonant capacitors for giving a good combination of losses such as hard switching losses, RMS losses, and core losses.

Embodiments also include the use of clamping diodes in order to limit the voltage across the additional switches and further optimize performance.

Figure 2:
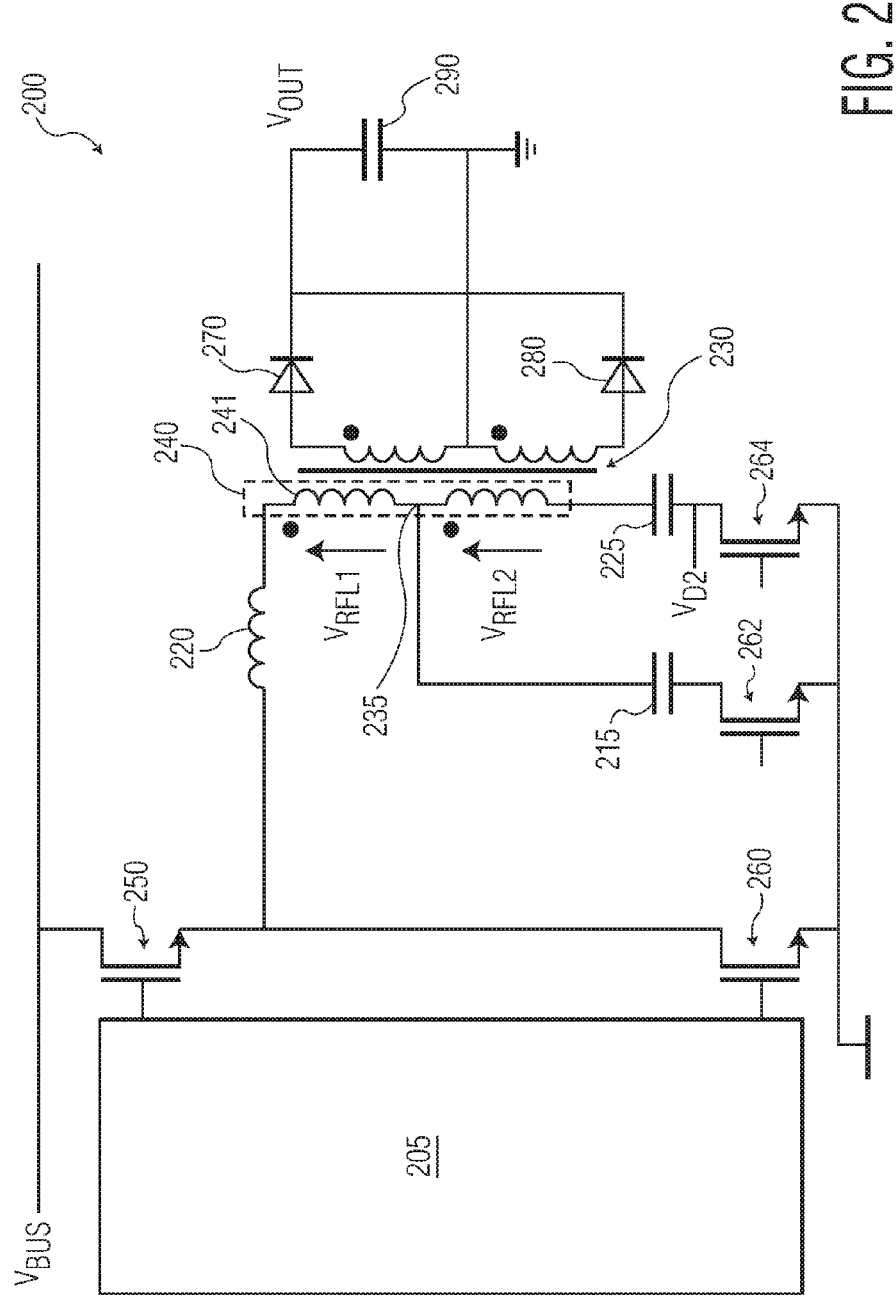
FIG. 2 illustrates another LLC resonant converter in accordance with embodiments described herein.

FIG. 2 illustrates an LLC resonant converter in accordance with embodiments described herein. Based on the LLC configuration according to FIG. 1, in FIG. 2 switches 262 and 264 are added and a primary winding tap 235 of the primary winding 240 is made. Switching transistors 250 and 260 control the duty cycle of a square wave output from controller 205. The resonant capacitor 110 of FIG. 1 is replaced by two resonant capacitors 215 and 225 in series with switches 262 and 264. The two capacitors 215 and 225 are placed in series with the switches 262 and 264 so that a voltage level shift may occur so that the voltage VD2 at the drain of the switch 264 is clamped at 0V while the switch 262 is on. This prevents a bidirectional switch allowing both positive and negative voltages at VD for the switch 264.

During a first mode of operation, the switch 262 is closed and the switch 264 is opened. Resonant capacitor 215 and resonant inductor 220 form a resonant tank circuit together with a magnetizing inductance of the transformer 230 from the tapped primary winding 240 at 235. A first reflected output voltage $V_{RFL1}$ becomes low as only an upper part 241 of the primary winding 240 is part of the resonant tank circuit. This mode can be used for low mains operation when $V_{BUS}$ is low.

During a second mode of operation, the switch 264 is closed and the switch 262 is opened. Resonant capacitor 225 and resonant inductor 220 form the resonant tank circuit together with the magnetizing inductance of the transformer 230 from the full primary winding 240. A second reflected output voltage $V_{RFL2}$ is taking part in the operation as now the full primary winding 240 is part of the resonant tank circuit. This mode can be used for high mains operation when $V_{BUS}$ is high. Alternatively this mode can be used for low mains when $V_{OUT}$ is low, for example as being used in combination with a power supply for USBPD with a low $V_{OUT}$, for example $V_{OUT}$ 5V. $V_{OUT}$=5V could be a selectable $V_{OUT}$ values within a series, for example 5V and 12V. A secondary circuit includes may include first rectifier diode 270, a second rectifier diode 280 and an output capacitor 290. Embodiments described herein are not limited to this configuration using diode rectifiers. In general synchronous rectification can be used to further increase efficiency.

Figure 3:
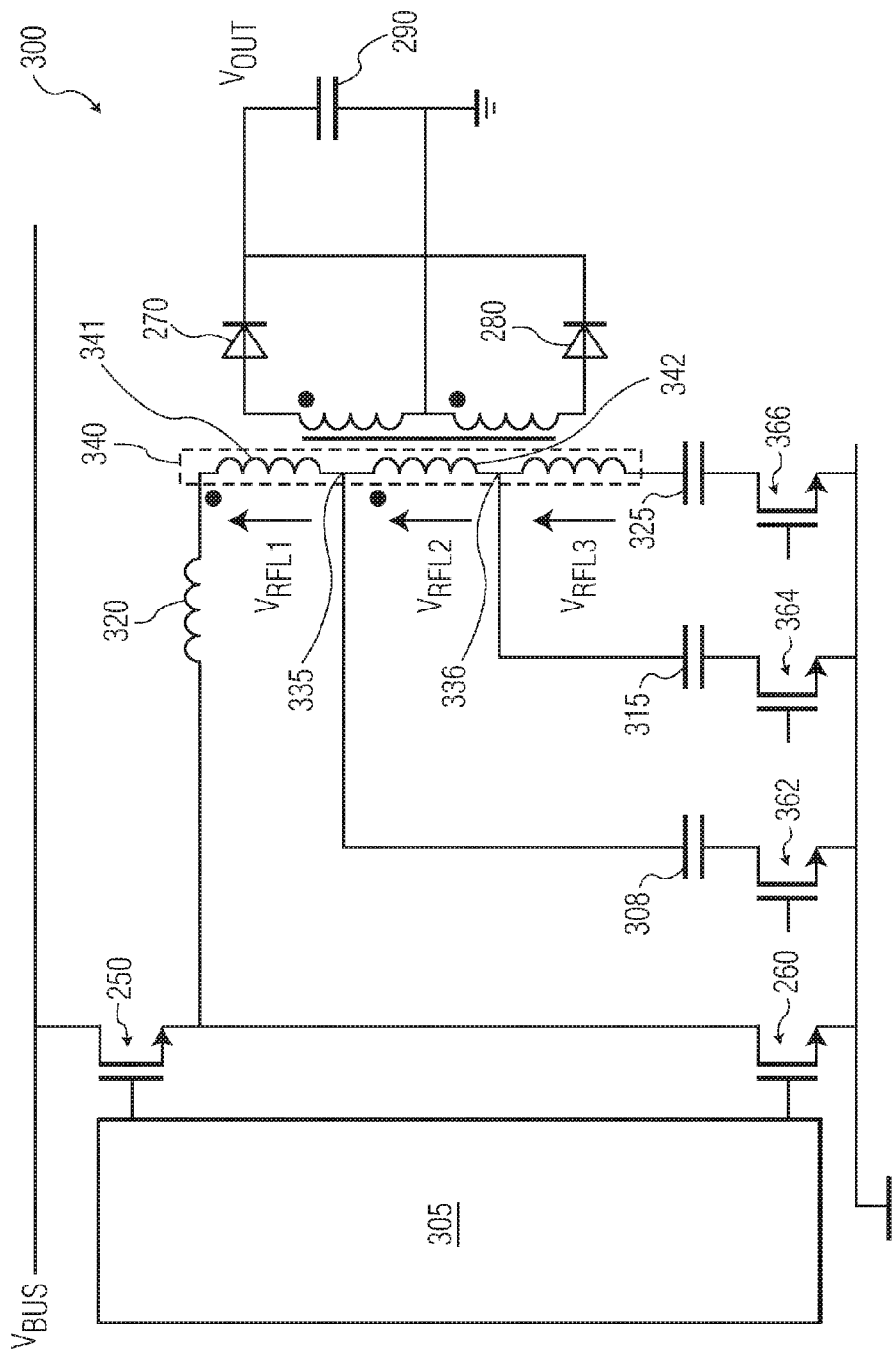
FIG. 3 illustrates a resonant converter with three taps in accordance with embodiments described herein.

FIG. 3 illustrates a resonant converter with three primary winding taps in accordance with embodiments described herein. Like numerals refer to components described in previous figures and are incorporated into the present figure to avoid redundancy. More than one primary winding tap is possible, for example with two primary winding taps 335 and 336 as illustrated in FIG. 3 such that the principles described in relation to FIG. 2 can be extended to a wider range of input and output voltages. Switching on switch 362 and switching off switches 364 and 366 allows a low voltage $V_{RFL1}$ to be reflected across a first part 341 of the primary winding 340. Switching on switch 364 while switching off switches 362 and 366 generates a medium voltage $V_{RFL2}$+$V_{RFL1}$ in the first part 341 and a second part 342 of the primary winding 340. Switching on switch 366 while switching off switches 362 and 364 generates a larger voltage $V_{RFL1}$+$V_{RFL2}$+$V_{RFL3}$ in the full primary winding 340. Values of capacitors 308, 315 and 325 are chosen to offset the reactance of inductor 320 and the magnetizing and leakage inductances produced by full and partial portions of the primary winding 340 to create various resonant tank circuits.

Figure 4:
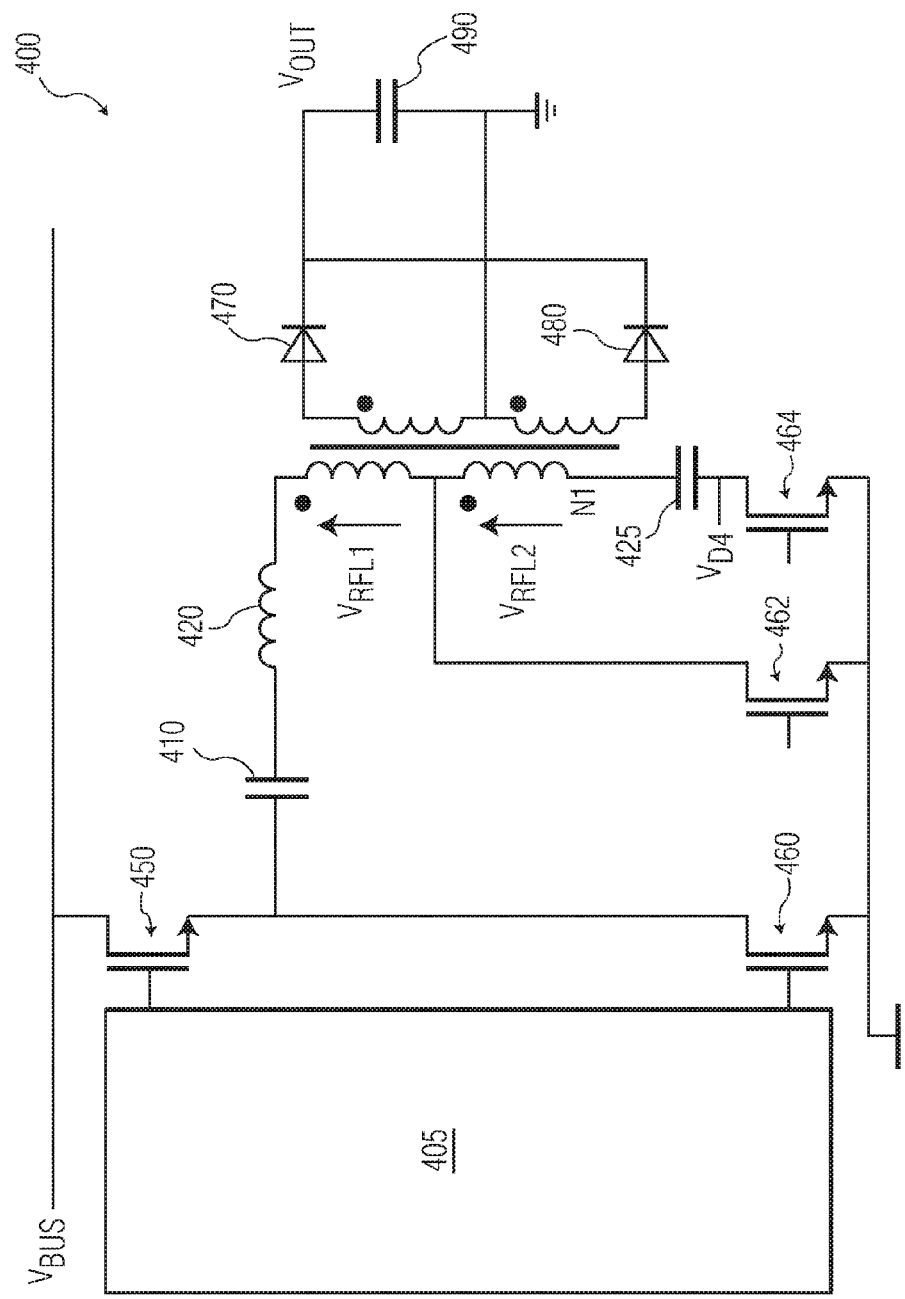
FIG. 4 illustrates a resonant converter where a resonant capacitor is placed in series with a half bridge node in accordance with embodiments described herein.

FIG. 4 illustrates a resonant converter where a resonant capacitor 410 and inductor 420 are placed in series with a half bridge node. Like numerals refer to components described in previous figures and are incorporated into the present figure to avoid redundancy. A half-bridge controller 405 switches two power MOSFETs 450 and 460 on and off in phase opposition symmetrically, that is, for the same time. Thus, a voltage applied to the resonant tank will be a square-wave with 50% duty cycle that swings from 0V to $V_{BUS}$.

When a switch 464 is closed, the voltage $V_{D4}$ the will be 0. As $V_{RFL1}$ and $V_{RFL2}$ are both part of the time positive or negative, the voltage at node N1 will also be negative for part of the time. Resonant capacitor 425 is then charged via a body diode (not illustrated) of the switch 464 such that a DC component occurs at the voltage across the resonant capacitor 425. A combination of tap selection and the resonant capacitor may prevent negative voltages at the switches as the capacitor in series builds up a required DC voltage term to prevent that. The resonant capacitor can be a combined capacitor such as capacitor 410 and capacitor 425. Embodiments described herein may use bidirectional switches or a switch in series with a diode may be used to allow both positive and negative voltages across the switch. Embodiments may have only one switching element in addition at the primary side. A secondary circuit includes a first rectifier diode 470, a second rectifier diode 480, and an output capacitor 490.

Figure 5:
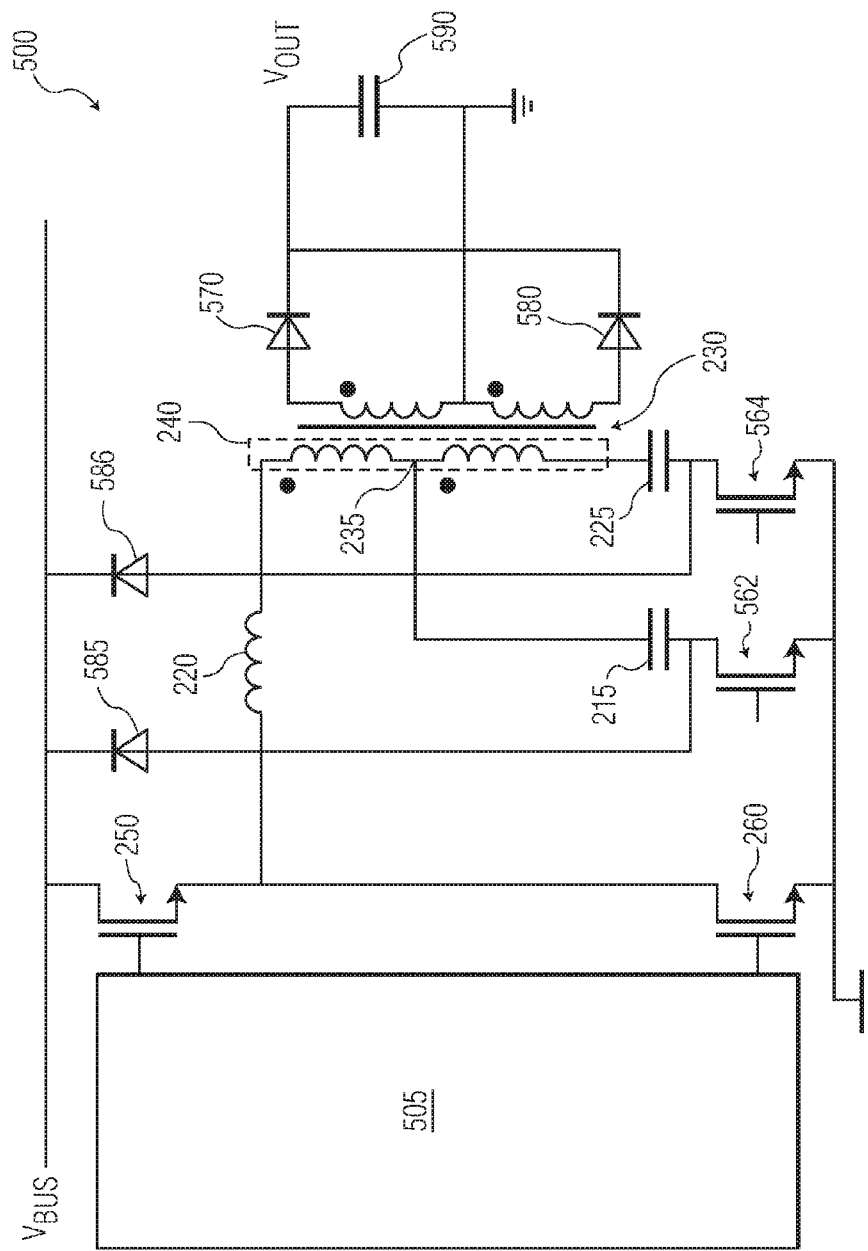
FIG. 5 illustrates a resonant converter including clamping diodes and in accordance with embodiments described herein.

FIG. 5 illustrates a resonant converter 500 including clamping diodes 585 and 586 in accordance with embodiments described herein. Like numerals refer to components described in previous figures and are incorporated into the present figure to avoid redundancy. Using clamping diodes 585 and 586 the voltage at drains of switches 562 and 564 is limited to $V_{BUS}$. In this way high peak voltages that would require larger biasing voltages for the switches can be prevented.

Figure 6:
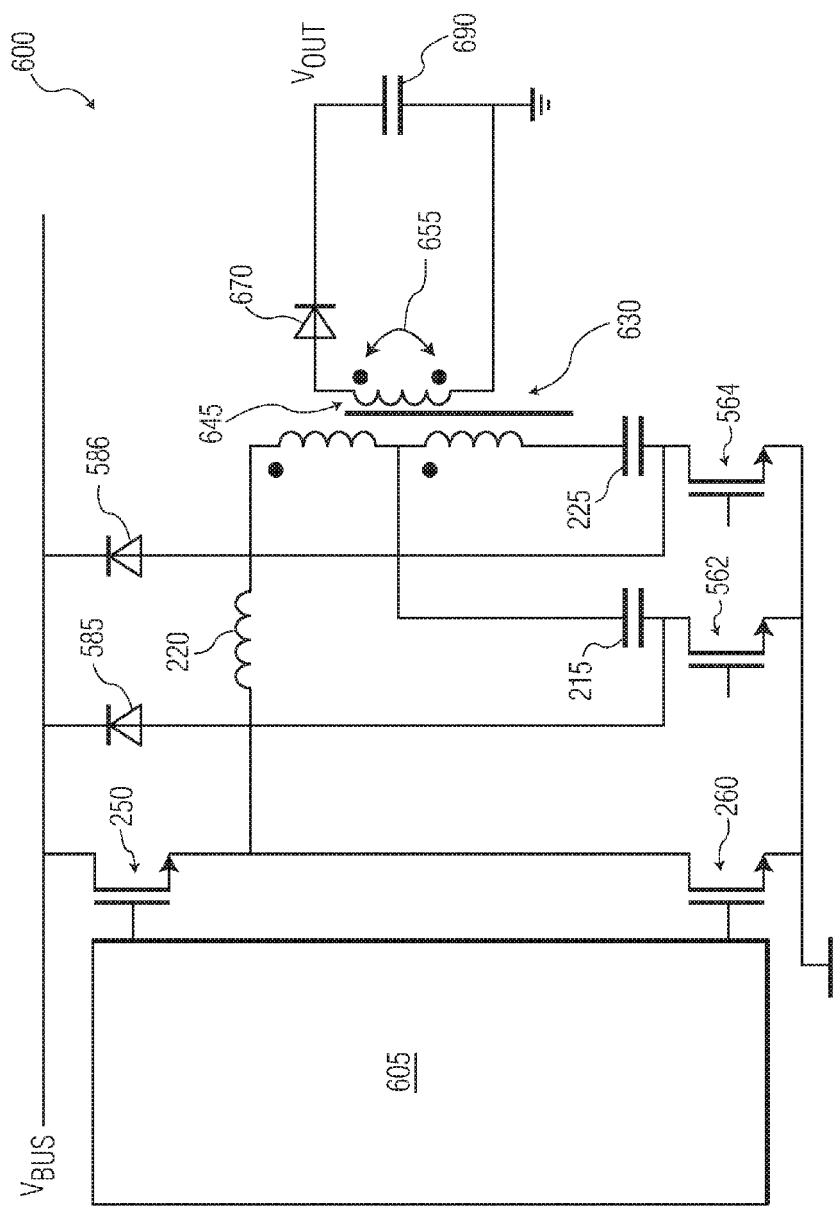
FIG. 6 illustrates a resonant converter in which only one secondary diode is used with an output capacitor in accordance with embodiments described herein.

FIG. 6 illustrates a resonant converter 600 in which only one secondary diode 670 is used with an output capacitor 690 in accordance with embodiments described herein. Like numerals refer to components described in previous figures and are incorporated into the present figure to avoid redundancy. The configuration of FIG. 6 allows for using the embodiment in combination with asymmetrical half-bridge converters in which an asymmetrical square wave is introduced to the transformer. The two dots 655 at the secondary winding 645 illustrate that both coupling directions are possible.

Figure 7:
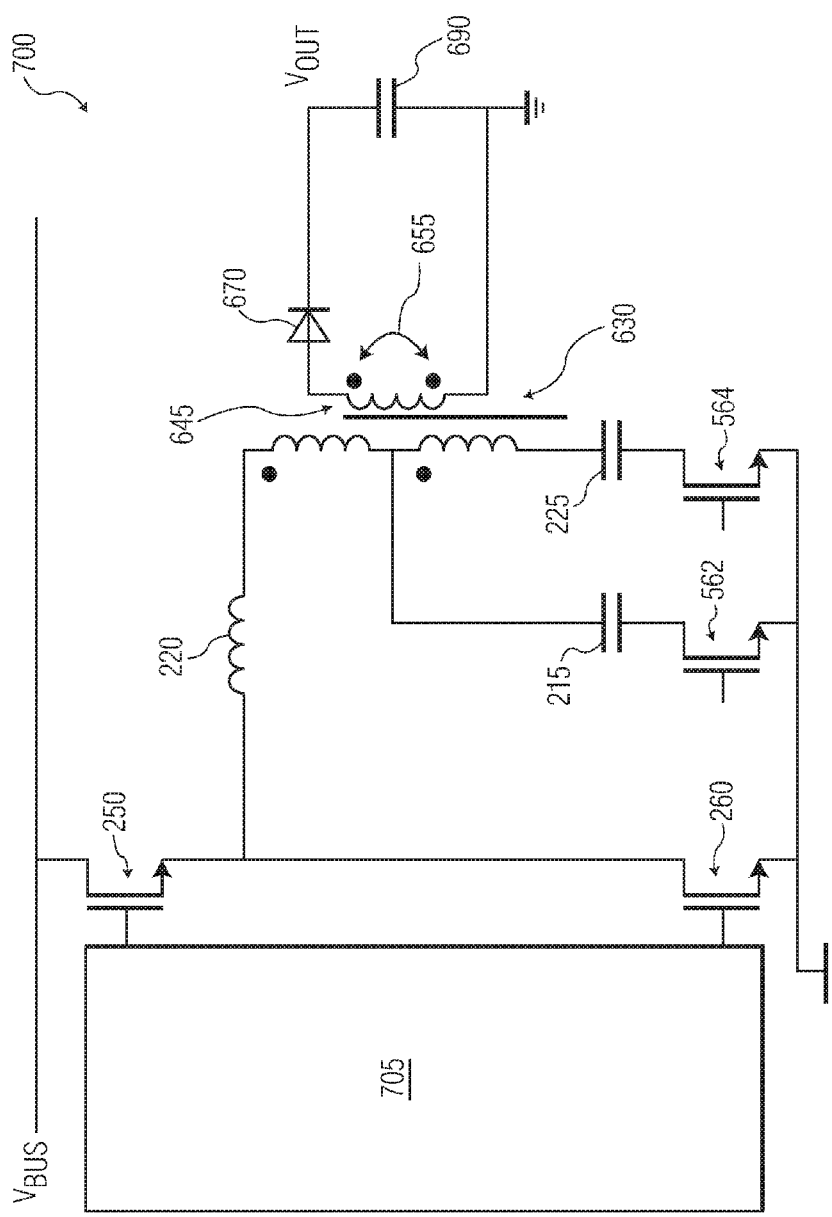
FIG. 7 illustrates an embodiment in which clamping diodes are not used in accordance with embodiments described herein.

In another embodiment as given in FIG. 7 clamping diodes are not used. Like numerals refer to components described in previous figures and are incorporated into the present figure to avoid redundancy. Several combinations and extensions of the embodiments mentioned are possible, for example using another direction of the dots between the primary winding taps, connecting the additional switches to $V_{BUS}$ instead of ground or replacing the clamping diodes for example in FIG. 5 in order to get a full bridge construction with switchable reflected output voltage. Using a full bridge construction may allow phase shifted control of the switches.

Figure 8:
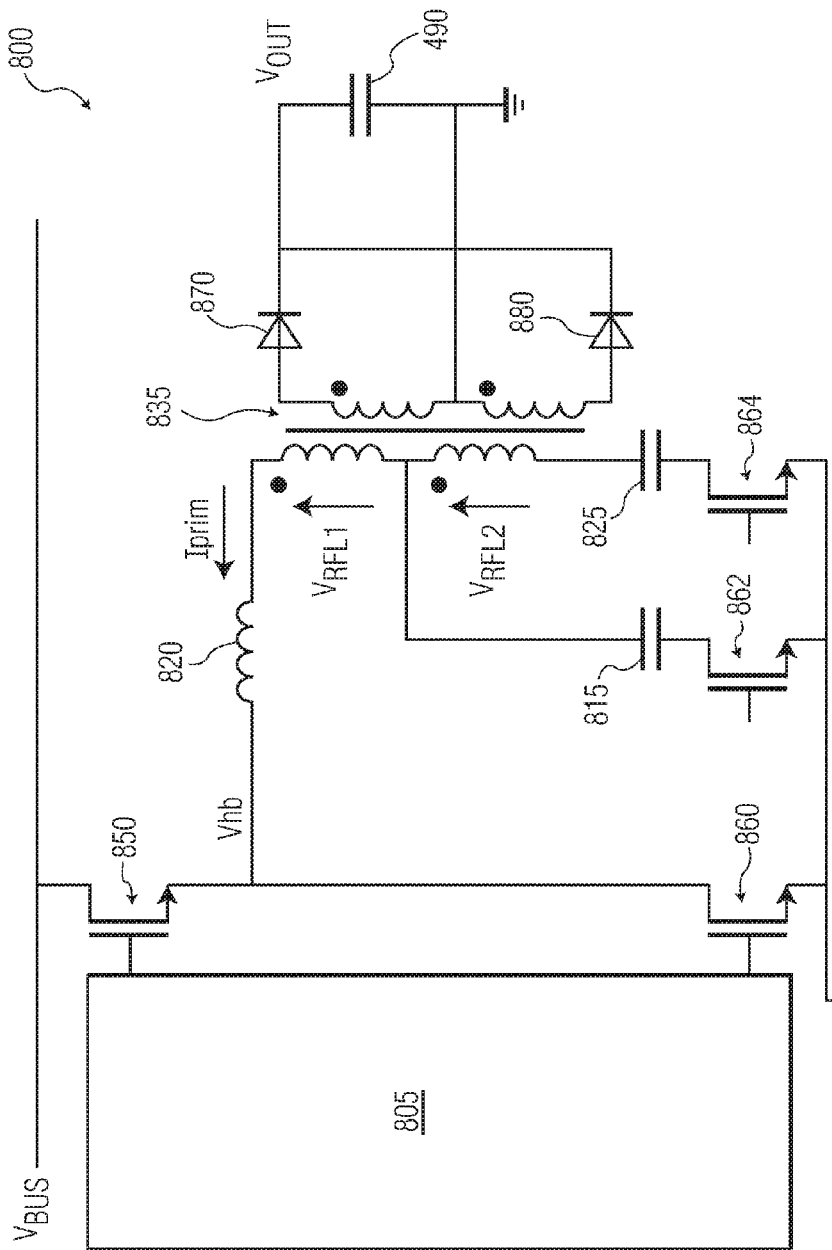
FIG. 8 illustrates a resonant converter with a rectified low mains operation in accordance with embodiments described herein.

FIG. 8 illustrates another LLC resonant converter in accordance with embodiments described herein. Like numerals refer to components described in previous figures and are incorporated into the present figure to avoid redundancy. As illustrated in FIG. 8, there may be representative, but not limiting values for the various components, to illustrate an example. The input voltage $V_{BUS}$ may be 140 VDC according to a rectified low mains operation. The output voltage $V_{OUT}$ may be 20V. The turns ratio is 30+30 turns primary and 6 turns secondary. Using the primary winding tap at 835 30 turns is selected by closing the switch 862. The magnetizing inductance and leakage inductance of the resonant inductor 820 with the switch 862 closed is 50 uH for the magnetizing inductance and 21 uH for the leakage inductance, when resonant capacitor 815 is 16 nF. The magnetizing inductance and leakage inductance with the switch 864 closed is 200 uH for the magnetizing inductance and 80 uH for the leakage inductance, when resonant capacitor 825 is 4 nF In the embodiment as tested, the resonance frequency for both modes of operation was on purpose chosen the same. The values of the various components are for example only and not meant to be limiting in any way. Embodiments described herein are feasible using many different values.

Figure 9:
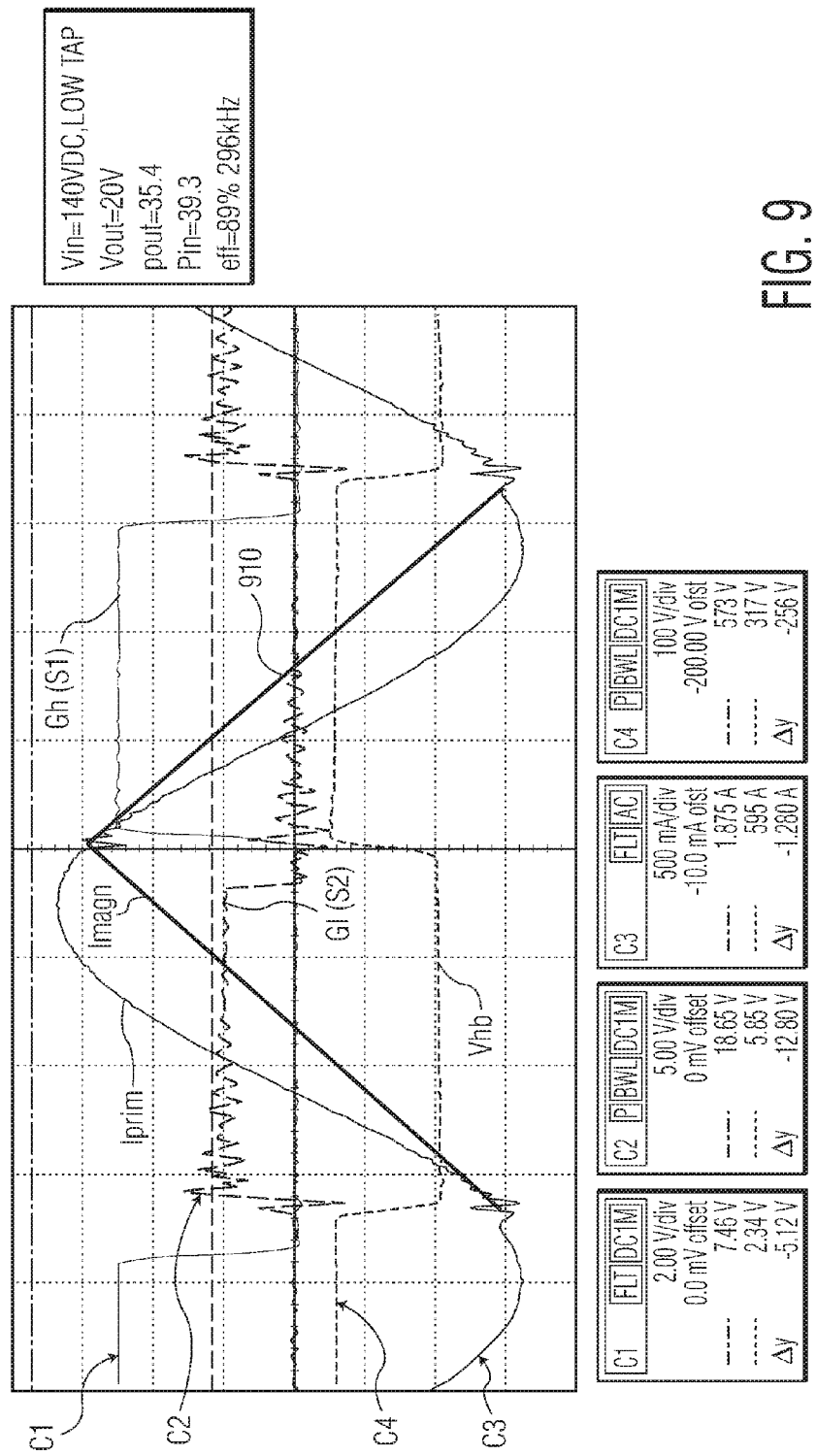
FIG. 9 illustrates a measurement result of a power converter according to the invention based on the schematic of FIG. 8.

FIG. 9 illustrates a measurement result of a power converter according to the embodiment of FIG. 8.

In conjunction with FIG. 8, C1 represents the gate voltage of the high side switch 850. C2 represents the gate voltage of the low side switch 860. C3 is the primary current flowing in the resonant inductor 820. C4 represents the voltage at the half bridge node Vhb. 910 represents the magnetizing current which is a part of the primary current that is not converted to output current, but rather used to store energy in the transformer. As illustrated in FIG. 9, the magnetizing current 910 is relatively large, at least larger than required for soft switching of the half-bridge node. This is because for high mains, where switch 864 is closed and switch 862 opened, a double amount of turns on the primary side 840 is selected. As both windings are coupled to switches 862 and 864, the resulting inductances will scale proportional to the square of the number of turns in the primary winding 840. This configuration may give a four times higher magnetizing inductance when the switch 864 is closed. As during the conduction interval of the secondary diodes, a reflected voltage $V_{RFL}$ occurs across the magnetizing inductance, which explains the triangular shape of the magnetizing current 910. For high mains with the switch 864 closed, the magnetizing inductance is four times the value for low mains with the switch 820 closed, however during high mains only two times the voltage ($V_{RFL1}+V_{RFL2}$ being both equal) occurs across the magnetizing inductance. This provides half of the peak current in the magnetizing inductance at high mains, compared to low mains, when using the same resonance frequency. As the stored energy in the magnetizing inductance equals 0.5×Lm×Ipeak2, the result is four times the inductance and Ipeak2 being ¼ so giving the same energy stored. For high mains however, more energy is required to charge the half-bridge node from $V_{BUS}$ to 0 and vice versa. As the energy W required for charging a capacitor equals $W=0.5 \times C_{HB} \times V_{BUS2}$, with $C_{HB}$ being the effective capacitance at the half-bridge node, a higher energy may be stored in the magnetizing inductance when having high mains operation. Thus, the energy stored in the magnetizing inductance may be adapted according to optimum performance for both high mains and low mains.

In an embodiment, the resonance frequency in high mains operation is therefore chosen lower than in low mains operation in order to get a higher peak current and therefore higher energy stored in the magnetizing inductance for high mains operation. In this way, no more energy is stored in the magnetizing inductance then required. This also provides the advantage of a lower RMS value of the primary current for low mains situation. As for low mains, the primary current is much higher compared to high mains, while the losses in the switches are proportional to the square of the RMS current.

Figure 10:
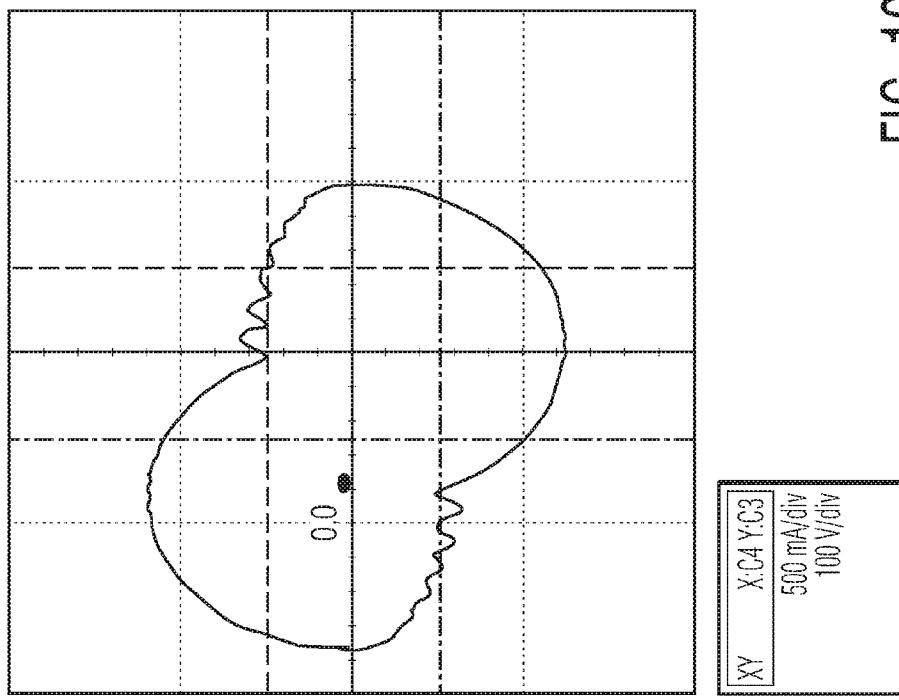
FIGS. 10 and 11 illustrate two different state plane representations leading to different efficiencies of embodiments described herein.
Figure 11:
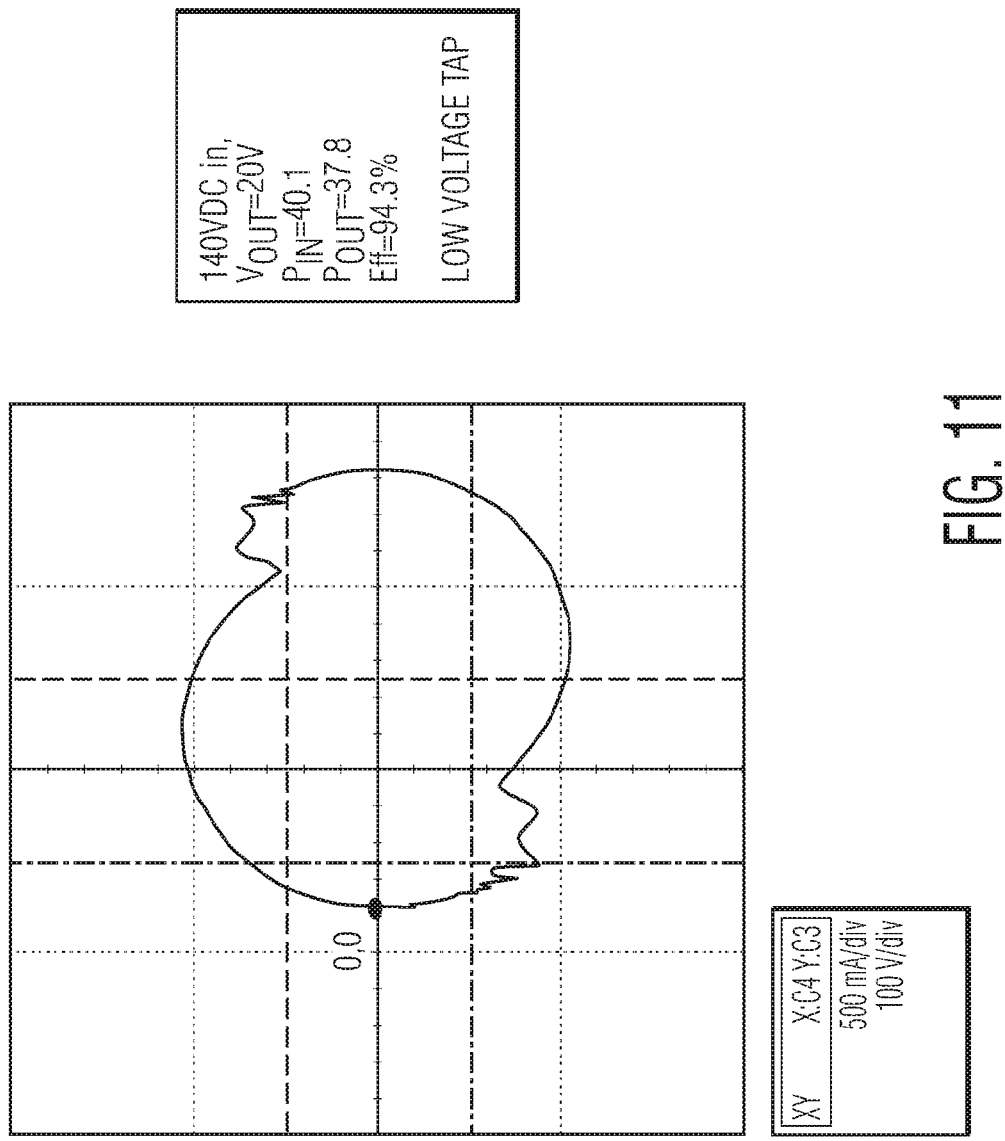

FIGS. 10 and 11 illustrate two different state plane representations leading to different efficiencies of embodiments described herein. FIG. 10 illustrates a state plane representation measurement of a converter according to the schematic of FIG. 8, operating at low mains with Vbus=140 VDC and switch 864 closed. In the state plane representation horizontally, the voltage across the resonant capacitor 820 is plotted against the primary current plotted vertically. As illustrated in FIG. 11, the measured efficiency of the converter is 94.3% as result of operation closer to resonance when 862 is closed instead.

Figure 12:
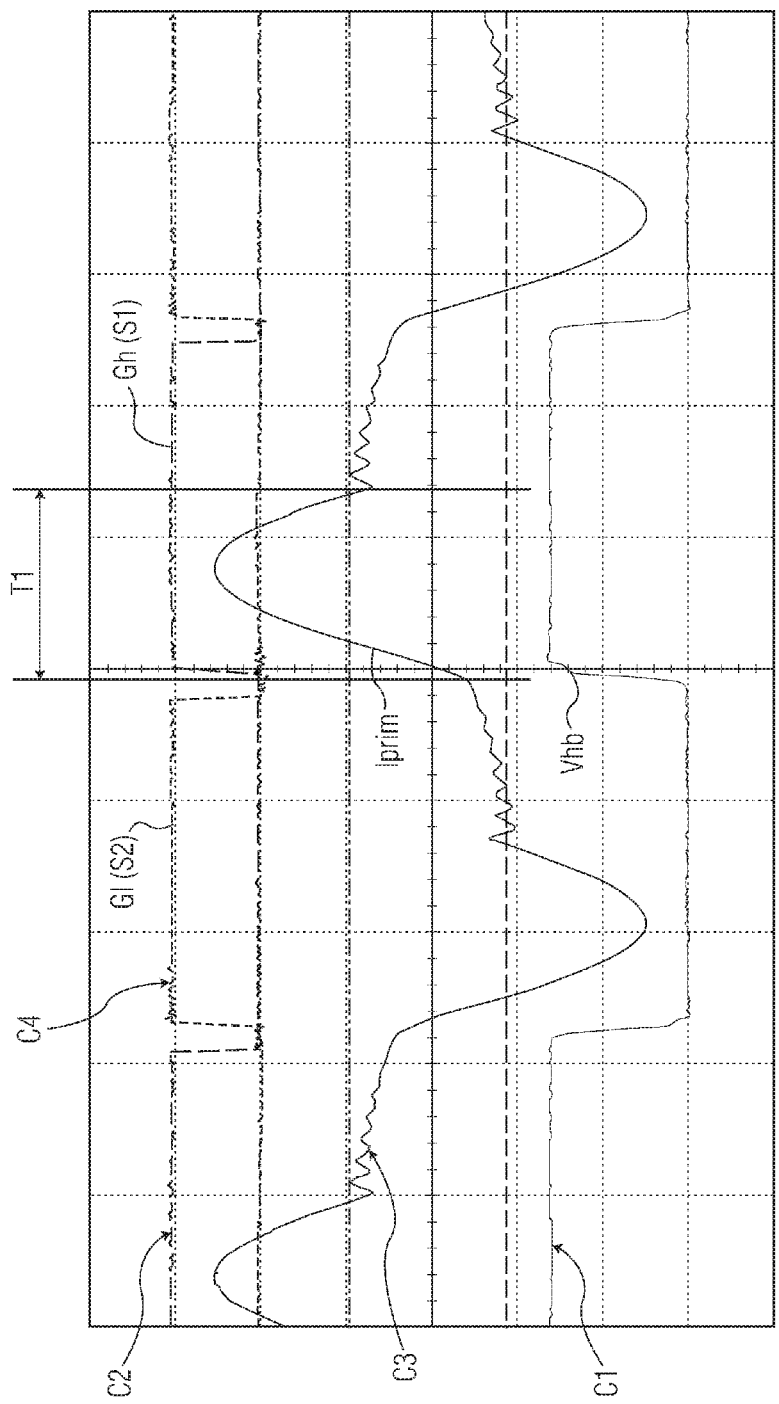
FIG. 12 illustrates wave forms in accordance with embodiments described herein.

FIG. 12 illustrates wave forms in accordance with embodiments described herein. The waveforms C1-C4 designate the same values as indicated above. FIG. 12 illustrates a time domain representation and measured waveform of a standard LLC converter with converter optimized in order to get the converter operating close to the load independent point for high mains at $V_{BUS}$=325V, using only the full primary winding with 30+30 turns. T1 is the interval where the secondary diode 880 is conducting. Now using this converter at low mains with $V_{BUS}$=148V the reflected output voltage may be much larger than the optimum. The result is a large interval where the secondary diodes are not conducting (outside the T1 interval).

The primary current Iprim as function of time illustrates a resonance during the interval T1 where the output current flows at the secondary side during the half-cycle. During an even larger part of time, no current flows at the secondary side. This gives a significant increase of the RMS current and therefore in the measurement of FIG. 10 only an efficiency of 88.5%, being significantly lower compared to the new embodiments described herein.

At a low output voltage, using the LLC converter with 50% duty cycle operation will give a significant increase of the switching frequency which can result in other issues. In order to prevent such issues, the embodiments may also be used in combination with asymmetrical operation.

Figure 13:
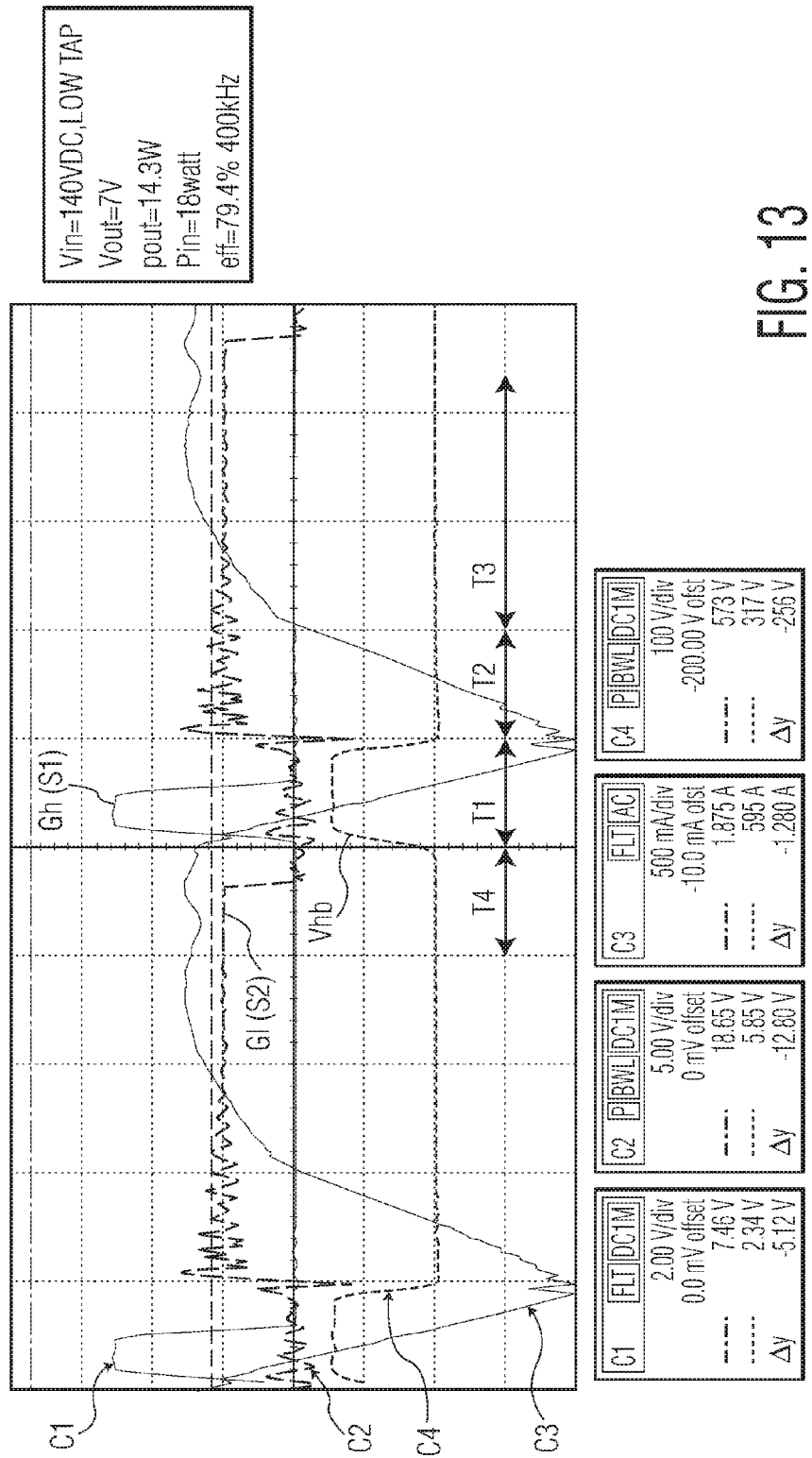
FIG. 13 illustrates other wave forms in accordance with embodiments described herein.

FIG. 13 illustrates other wave forms in accordance with embodiments described herein. The waveforms C1-C4 designate the same values as indicated above. In an embodiment according to FIG. 13 the same converter is used as with FIG. 9 and FIG. 8. $V_{BUS}$=140 VDC, the low primary winding tap is used and $V_{OUT}$=7V. In order to get optimum performance in combination with low $V_{OUT}$, asymmetrical operation is used at a frequency of 400 kHz. Using 400 kHz it is possible to let the resonant tank circuit make an almost full resonant half-cycle together with a short half-cycle where the energy is put from $V_{BUS}$ into the resonant tank circuit. During an interval T1 a High side switch 850 conducts and energy is put into the resonant tank circuit from $V_{BUS}$ and is partly delivered directly to the load. During an interval T2 energy is delivered from the resonant tank circuit to the load. During an interval T3 energy delivery continues to the load, but via the secondary diode 880. Finally during T4 the secondary diode 880 stops conducting and at the end of T4 magnetizing energy left is used to charge the half-bridge node to the opposite supply in order to prepare for soft switching.

Figure 14:
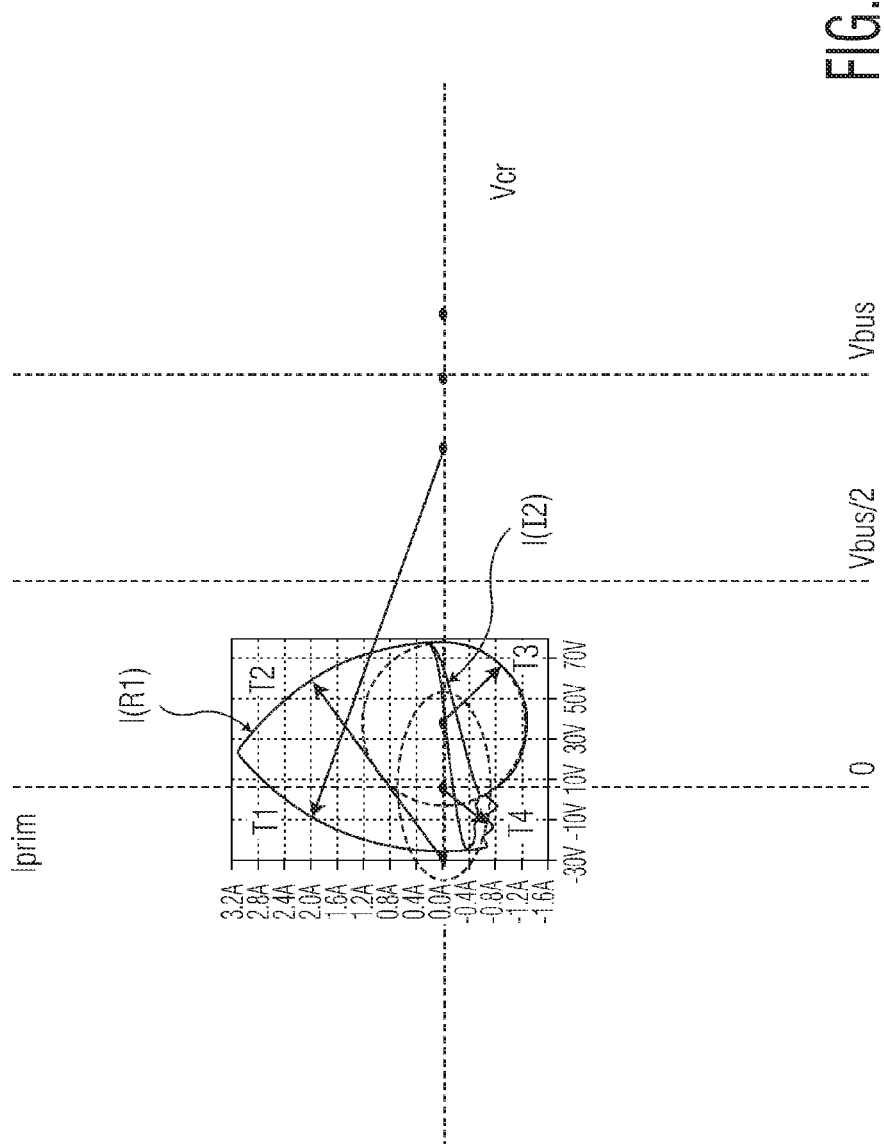
FIGS. 14 and 15 illustrate state plane representations in accordance with embodiments described herein.
Figure 15:
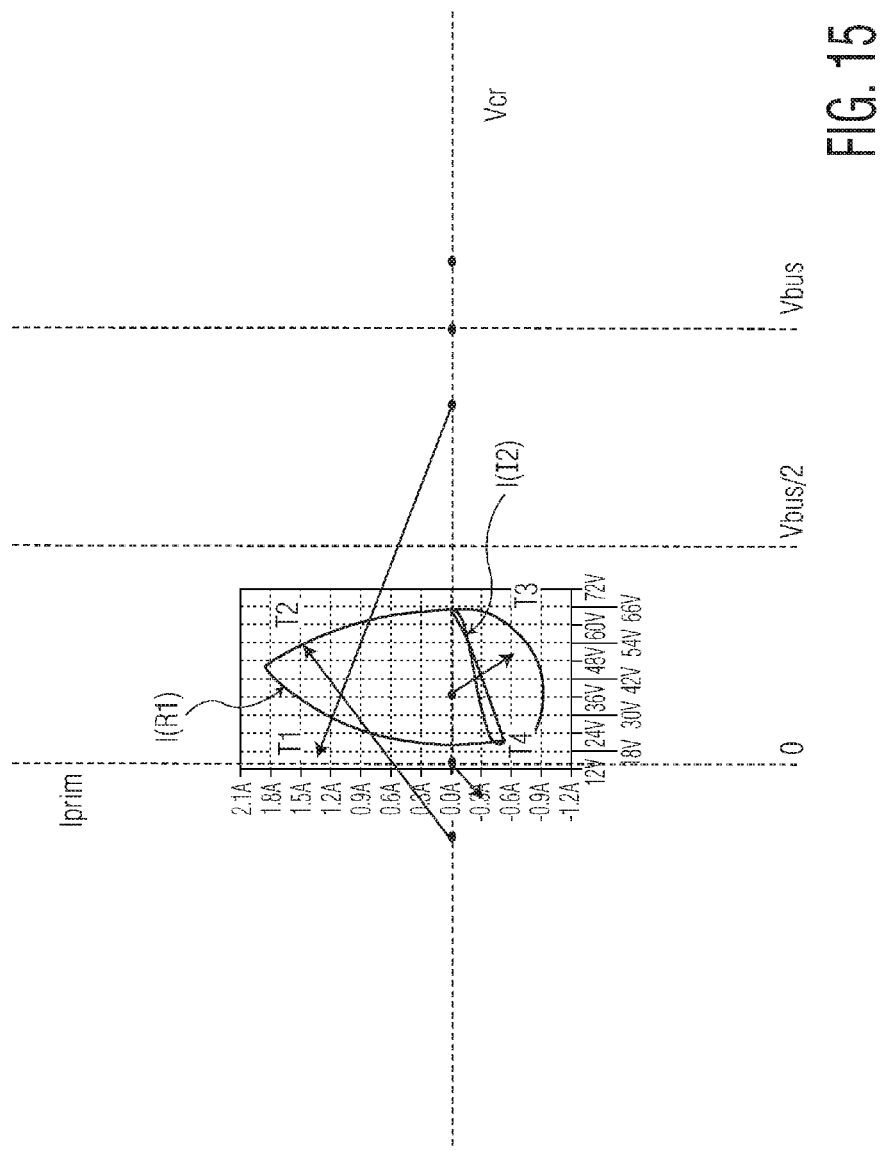

FIGS. 14 and 15 illustrate state plane representations in accordance with embodiments described herein. The same principle can be studied more in detail using the state plane representation according to FIG. 14 and FIG. 15. In the state plane diagram the time passes while following the trajectory in a clockwise direction. In FIGS. 14 and 15, I(R1) represents the primary current plotted against the voltage across the resonant capacitor. I(I2) represents the magnetizing current plotted against the voltage across the resonant capacitor.

FIG. 14 illustrates the situation based on simulations similar to the measurement of FIG. 13. The intervals T1-T4 are also indicated. At the beginning of interval T4, the magnetizing current and primary current become equal, therefore the difference between both, the output current becomes zero.

In FIG. 15, the duration of interval T3+T4 is chosen such that the end of interval T3 is close to the point where the secondary diodes 880 stop conducting. In this case the length of the interval T3 is slightly shorter than the half a period of the resonance frequency as set by the leakage inductance and resonant capacitor. This operating point illustrates a good efficiency and is therefore a goal of the embodiment to operate close to this point. This range is basically the reduction of T4 to 0 with all values in between. As T3 may be finished before the current reaches 0 because some current is required for soft switching, T3 is slightly shorter than half of the resonance period.

Looking to the possibilities to control the timing sequence of the converter, one can use the well known frequency control methods where the power is regulated by the operating frequency and when asymmetrical operation is used, the power can be further controlled by adapting the duty cycle between a half-cycle and the total period. It is also possible to control the conduction time of a switch, for example to set the proper duration of the T1 interval.

Instead of using duty cycle, on-time, and frequency, embodiments also include a use of state variables to control the timing of the switches. Such state variables may be the primary current, the voltage across the resonant capacitor, or voltage across the primary transformer winding. An embodiment may use the primary peak current to set the proper duration of the T1 interval as the voltage difference across the resonant capacitor between the start and end of an interval as related to the energy stored during that interval. It is also possible to use the voltage across the resonant capacitor to set the end of a conduction cycle. Another embodiment may use a related variable such as the voltage across the transformer winding or the change of such variable compared to the start of an interval.

According to embodiments described herein, a resonant converter may be used with a selectable turns ratio in order to have the converter operating close to an optimal point for both low and high mains operation. The converter may use asymmetrical operation for low output voltages.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

The invention claimed is:

1. A power converter comprising:
   a generator configured to generate a sequence of output voltage waveforms;
   a first switching transistor and a second switching transistor connected to the generator and configured to control a duty cycle of the output voltage waveforms;
   an input voltage line connected to the first switching transistor;
   a resonant tank connected to the generator comprising at least one capacitor and at least one inductor;
   a transformer including a primary side connected in series with the at least one inductor, wherein the primary side is configured to use at least one primary winding tap and a secondary side for connecting to a rectifying circuit for providing a rectified DC voltage to an output load circuit; and
   a first switch and a second switch on the primary side connected to the at least one primary winding tap, wherein the at least one primary winding tap is selected by the first switch or the second switch to select a reflected output voltage by closing the first switch or the second switch; and
   a plurality of clamping diodes connected between the first switch and the second switch and the input line and configured to limit voltage across the first switch or the second switch.

2. The power converter of claim 1, wherein the power converter is an LLC converter.

3. The power converter of claim 1, wherein the power converter is an asymmetrical half-bridge converter.

4. The power converter of claim 1, wherein a turns ratio for each primary winding tap is optimized for efficiency.

5. The power converter of claim 1, wherein output power is controlled by adapting a duty cycle of the generator between a half-cycle and a total period.

6. The power converter of claim 1, wherein output power is controlled by adapting a duty cycle of the generator from zero to a half-cycle.

7. The power converter of claim 1, wherein the power converter is controlled by state variables.

8. The power converter of claim 1, wherein the rectifying circuit includes a rectifier diode.

9. The power converter of claim 8, wherein energy is delivered to the load via the rectifier during a time period.

10. The power converter of claim 9, wherein an operating frequency of the generator is chosen such that the end of the time period is close to a point where the rectifier stops conducting.

11. The power converter of claim 10, wherein the time period is slightly shorter than half a period of a resonance frequency of the power converter as set by the at least one inductor and at least one capacitor.

12. The power converter of claim 9, wherein the time period is optimized to get operation close to resonance frequency during a half-cycle.

13. The power converter of claim 1, wherein the generator generates a square wave.

14. The power converter of claim 1, wherein the resonant tank includes at least one capacitor in series with the at least one inductor.

15. The power converter of claim 1, wherein the selection of the first switch or the second switch is based on a desired output voltage.

16. The power converter of claim 1, wherein the power converter receives voltage from a mains and the selection of the first switch or the second switch is based on a level of the mains voltage.

17. A method of operating a power converter including a generator, at least one capacitor and at least one inductor, a transformer including a primary side and a secondary side, the primary side connected in series with the inductor, and a plurality of switches on the primary side and connected to a primary winding, the method comprising:

operating the plurality of switches on a primary side of the transformer to form a resonant tank circuit including a plurality of taps;

selecting at least one of the plurality of taps to vary an output voltage of the power converter; and delivering energy to a load via a rectifier during a time period, wherein an operating frequency of the generator is chosen such that the end of the time period is close to a point where the rectifier stops conducting, and wherein the time period is slightly shorter than half a period of a resonance frequency of the power converter as set by the at least one inductor and at least one capacitor.

18. The method of claim 17, comprising selecting one of the plurality of taps based on a desired output voltage.

19. The method of claim 17, comprising receiving voltage from a mains and selecting of one of the plurality of taps based on a level of the mains voltage.

20. A power converter comprising:

a generator configured to generate a sequence of output voltage waveforms;

a resonant tank connected to the generator comprising at least one capacitor and at least one inductor;

a transformer including a primary side connected in series with said series inductor, wherein the primary side is configured to use at least one primary winding tap and a secondary side for connecting to a rectifying circuit including a rectifier diode for providing a rectified DC voltage to an output load circuit; and a first switch and a second switch on the primary side connected to the primary winding, wherein the at least one primary winding is selected by the first switch or the second switch to select a different reflected output voltage by closing the first switch or the second switch, wherein energy is delivered to the load via the rectifier during a time period, wherein an operating frequency of the generator is chosen such that the end of the time period is close to a point where the rectifier stops conducting, and wherein the time period is slightly shorter than half a period of a resonance frequency of the power converter as set by the at least one inductor and at least one capacitor.

* * * * *